__United States Patent Office__

3,002,012
Patented Sept. 26, 1961

3,002,012
METHOD FOR THE PREPARATION OF NORMAL LEAD STYPHNATE
Joseph R. Backensto, Marion, Ill., assignor to Olin Mathieson Chemical Corporation, East Alton, Ill., a corporation of Virginia
No Drawing. Filed Jan. 16, 1958, Ser. No. 709,209
5 Claims. (Cl. 260—435)

This invention relates to normal lead styphnate and to a method of making the same.

The normal lead salt of 2,4,6 trinitroresorcinol, more commonly and hereinafter referred to as normal lead styphnate, is conventionally prepared by reacting a lead salt with an excess of styphnic acid in an aqueous medium. The lead salt, usually lead acetate, and the styphnic acid are separately dissolved in water and then mixed together. Upon mixing of these two aqueous solutions, an intermediate gel is formed. It is in this gel that the normal lead styphnate crystals are formed. There is little or no control over the crystal formation and thus the particle size of the salt varies over a wide range. The small crystals of the normal salt are most desirable for use in ammunition priming mixtures and in detonator compositions. Thus, a necessary adjunct to the present methods of preparing this lead salt is grinding the explosive crystals, or recrystallizing them from a solvent. Such additional steps are not completely satisfactory and, in addition, are hazardous and time consuming.

It is, therefore, an object of this invention to provide a novel method for the preparation of normal lead styphnate. It is a more specific object of this invention to provide a process for the preparation of small uniform crystals of normal lead styphnate.

In accordance with this invention, these and other objects are accomplished, generally speaking, by reacting styphnic acid with a dissolved lead salt in a non-aqueous medium and then adding water to this medium. More specifically, this invention contemplates the preparation of small, uniform crystals of normal lead styphnate by the reaction in the presence of acetic anhydride of a lead salt such as lead acetate or lead nitrate dissolved in glycerin with styphnic acid in a solvent therefor that is miscible with glycerin and with water in the presence of glycerin, and then adding water to the reaction mixture. Methyl alcohol and acetone are the preferred solvents but other solvents that are miscible with glycerin and water can also be used, provided that the pH of the solution does not exceed about 4.5. Acetic anhydride is present in the reaction mixture in sufficient amount to maintain the pH of the reaction mixture below about 4.5, thus insuring the formation of the normal salt. In order to insure the uniform mixing of the solution and the water, the system must be agitated throughout the reaction.

The size range of the crystalline product varies roughly inversely with the amount and rate of addition of water to the reaction mixture. Thus, relatively large crystals can be obtained by the rapid addition of large quantities of water whereas the more desirable small crystals are obtained by the slow or incremental addition of relatively smaller amounts of water. The particle size of the product is also controlled to a lesser degree by the temperature of the system, with slightly smaller crystals being obtained at increased temperatures. Normal lead styphnate having a particle size between 8 to 12 microns can be readily prepared and, if desired, the process can be controlled so as to yield crystals having an average particle size in the neighborhood of 1 micron.

While the solvents used in accordance with this invention are non-aqueous, they are not necessarily anhydrous. Thus, technical grades of reagents containing small amounts of water can be used as well as more highly purified solvents. In some instances, it is also desirable to utilize a wetting agent which may be dissolved in either of the solvents entering the reaction mixture or in the water.

The invention will be more fully understood by referring to the following specific example of a preferred embodiment thereof.

A glycerin solution of lead acetate was prepared by dissolving 16 grams of lead acetate in 30 cc. of glycerin. A separate solution was prepared by dissolving 10 grams of styphnic acid in 50 cc. of acetone. This solution also contained 2 cc. of acetic anhydride and 0.01 cc. of a sorbitan monolaurate polyoxyethylene derivative as a liquid wetting agent. These solutions were maintained at a temperature of approximately 25° C. and the lead acetate solution was then added to the styphnic acid solution with thorough agitation. About 50 cc. of water were then added to the reaction mixture, and the agitation stopped for a brief period (about 5 minutes). At the end of this period, another 20 cc. of water were added and the agitation was started again and continued for approximately 5 minutes. The agitation was again interrupted for a 5 minute period, after which another 5 cc. of water were added and the system was agitated very gently until all of the normal lead salt had crystallized. This process yielded about 20 grams of normal lead styphnate crystals, 95% of which had a particle size between 8 and 12 microns.

The normal lead styphnate prepared in accordance with this invention is of uniform particle size, handles and dries easily, does not pick up static electric charges, and does not cake while drying. Analysis shows the lead content of this salt to be 43% as compared with the theoretical lead content of 42.6% for normal lead styphnate.

While the above specific example teaches that the lead acetate solution is added to the styphnic acid solution, it will be readily understood that this sequence can be reversed. In addition, the process can be readily modified to provide a continuous operation by mixing streams of the dissolved reactants and subsequently adding water to the mixed stream. It is to be distinctly understood, therefore, that various modifications or changes can be made without departing from the spirit and scope of this invention, except as limited by the appended claims.

Having thus described this invention, what is claimed is:

1. A method for the preparation of normal lead styphnate which comprises intermixing a glycerin solution of a lead salt selected from the group consisting of lead acetate and lead nitrate with a solution of styphnic acid in a solvent that is miscible with glycerin and water, in the presence of acetic anhydride, the reaction mixture having a pH below about 4.5, and subsequently adding water to the reaction mixture.

2. A method for the preparation of normal lead styphnate which comprises mixing a glycerin solution of lead acetate with a solution of styphnic acid and acetic anhydride in a solvent that is miscible with glycerin and water, the reaction mixture having a pH below about 4.5, and subsequently adding water to the reaction mixture.

3. A method for the preparation of normal lead styphnate which comprises mixing a glycerin solution of lead acetate with an acetone solution of styphnic acid and acetic anhydride, the reaction mixture having a pH below about 4.5, and gradually adding water to the mixture.

4. A method for the preparation of normal lead styphnate which comprises mixing a glycerin solution of lead acetate with a methyl alcohol solution of styphnic acid and acetic anhydride, the reaction mixture having a pH below about 4.5, and gradually adding water to the mixture.

5. A method for the preparation of normal lead styphnate which comprises mixing a glycerin solution of lead acetate with a solution of styphnic acid and acetic anhydride dissolved in a solvent that is miscible with glycerin and water, the reaction mixture having a pH below about 4.5, and subsequently adding increments of water to the reaction mixture.

References Cited in the file of this patent

UNITED STATES PATENTS 2,295,104    Garfield _____ Sept. 8, 1942